United States Patent
Cleveland et al.

(10) Patent No.: US 8,891,455 B2
(45) Date of Patent: Nov. 18, 2014

(54) SYNCHRONOUS SPECTRUM SHARING BY DEDICATED NETWORKS USING OFDM/OFDMA SIGNALING

(75) Inventors: Joseph R. Cleveland, Murphy, TX (US); William J. Semper, Richardson, TX (US); Changhoi Koo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1792 days.

(21) Appl. No.: 11/805,113

(22) Filed: May 22, 2007

(65) Prior Publication Data
US 2008/0095100 A1 Apr. 24, 2008

Related U.S. Application Data

(63) Continuation-in-part of application No. 11/585,009, filed on Oct. 23, 2006.

(60) Provisional application No. 60/920,447, filed on Mar. 28, 2007, provisional application No. 60/919,622, filed on Mar. 23, 2007.

(51) Int. Cl.
| | |
|---|---|
| *H04W 4/00* | (2009.01) |
| *H04W 40/00* | (2009.01) |
| *H04W 72/00* | (2009.01) |
| *H04J 3/00* | (2006.01) |
| *H04B 7/208* | (2006.01) |
| *H04B 7/212* | (2006.01) |
| *H04L 5/00* | (2006.01) |
| *H04L 5/02* | (2006.01) |
| *H04W 16/14* | (2009.01) |
| *H04W 72/10* | (2009.01) |
| *H04W 72/04* | (2009.01) |

(52) U.S. Cl.
CPC ............ *H04L 5/023* (2013.01); *H04W 72/042* (2013.01); *H04L 5/0037* (2013.01); *H04L 5/0062* (2013.01); *H04L 5/0007* (2013.01); *H04W 16/14* (2013.01); *H04L 5/0048* (2013.01); *H04L 5/0053* (2013.01); *H04W 72/10* (2013.01)
USPC ........... 370/329; 370/337; 370/341; 370/344; 455/448; 455/450; 455/452.1; 455/454

(58) Field of Classification Search
USPC .......... 370/341, 344, 329, 337; 455/448, 450, 455/452.1, 454
See application file for complete search history.

(56) References Cited

U.S. PATENT DOCUMENTS

| | | | |
|---|---|---|---|
| 6,131,031 A | * | 10/2000 | Lober et al. .................... 455/444 |
| 2004/0233888 A1 | * | 11/2004 | Bonta et al. .................... 370/350 |

(Continued)

OTHER PUBLICATIONS

Translated Office Action dated Dec. 17, 2013 in connection with Korean Patent Application 10-2007-0106319; 8 pages.

(Continued)

*Primary Examiner* — Olumide T Ajibade Akonai
*Assistant Examiner* — Edd Rianne Plata (57) ABSTRACT

A system and method for synchronous spectrum sharing for a dedicated network in a wireless communication system based on orthogonal frequency-division multiplexing (OFDM) or orthogonal frequency division multiple access (OFDMA) signaling is disclosed. The system and method includes detecting a frame of a broadcast waveform and extracting idle spectrum information associated with the dedicated subchannel to the secondary user node. The system allows transmitting data from the secondary user node in unused symbol slots identified in the idle spectrum information thereby making efficient use of unused or idle spectrum. Accordingly, secondary users of the wireless communication system can dynamically form ad-hoc mesh network communications in fixed or mobile scenarios.

22 Claims, 9 Drawing Sheets

(56) References Cited

U.S. PATENT DOCUMENTS

| | | | |
|---|---|---|---|
| 2006/0203711 A1* | 9/2006 | Oh et al. | 370/208 |
| 2006/0281404 A1* | 12/2006 | Lee et al. | 455/11.1 |
| 2007/0121546 A1* | 5/2007 | Zuckerman et al. | 370/329 |
| 2007/0133387 A1* | 6/2007 | Arslan et al. | 370/206 |
| 2007/0286066 A1* | 12/2007 | Zhang et al. | 370/208 |

OTHER PUBLICATIONS

Translated Final Office Action dated Dec. 17, 2013 in connection with Korean Patent Application 10-2007-0106319; 6 pages.

* cited by examiner

SYNCHRONOUS SPECTRUM SHARING BY DEDICATED NETWORKS USING OFDM/OFDMA SIGNALING

CROSS-REFERENCE TO RELATED APPLICATION(S) AND CLAIM OF PRIORITY

This application is a continuation-in-part of U.S. patent application Ser. No. 11/585,009, filed Oct. 23, 2006, entitled "SYNCHRONOUS SPECTRUM SHARING BASED ON OFDM/OFDMA SIGNALING". Application Ser. No. 11/585,009 is assigned to the assignee of this application and is incorporated by reference into this application as if fully set forth herein. The present application claims priority under 35 U.S.C. §120 to U.S. patent application Ser. No. 11/585,009.

This application is also related to U.S. Provisional Patent No. 60/920,447, filed Mar. 28, 2007, entitled "METHOD AND PROCEDURE FOR SPECTRUM SHARING BETWEEN CELLULAR NETWORKS THAT EMPLOY OFDMA AND AD HOC NETWORKS". Provisional Patent No. 60/920,447 is assigned to the assignee of this application and is incorporated by reference into this application as if fully set forth herein. The present application hereby claims priority under 35 U.S.C. §119(e) to U.S. Provisional Patent No. 60/920,447.

This application is related to U.S. Provisional Patent No. 60/919,622, filed Mar. 23, 2007, entitled "METHOD AND PROCEDURE FOR SPECTRUM SHARING BY DEDICATED NETWORKS IN MOBILE CELLULAR NETWORKS THAT EMPLOY OFDMA". Provisional Patent No. 60/919,622 is assigned to the assignee of this application and is incorporated by reference into this application as if fully set forth herein. The present application claims priority under 35 U.S.C. §119(e) to U.S. Provisional Patent No. 60/919,622.

TECHNICAL FIELD OF THE INVENTION

The present disclosure relates generally to communication networks and, in particular, to systems for synchronous spectrum sharing.

BACKGROUND OF THE INVENTION

Conventional fixed spectrum allocation schemes lead to significant spectrum under-utilization. For instance, experiments have indicated that as much as 62% of the spectrum below the 3 GHz band is idle even in the most crowed areas (e.g., near downtown Washington D.C. where both government and commercial spectrum usage is intensive). Such under-utilization and increasing demand for the radio spectrum suggest that a more effective spectrum allocation and utilization policy is necessary.

Currently, secondary users may use the licensed spectrum only when such use does not interfere with a primary user's communication. Such requirements imply that the use of the spectrum varies with time (i.e., dynamically changes), and is dependent on the load imposed by the primary users. Several conventional systems use multiple channels in wireless networks. However, such systems fail in dynamic spectrum access networks. For example, conventional systems assume that the set of available channels is static (i.e., the channels available for use are fixed at the time of network initiation). In multiple access wireless networks, however, such as Worldwide Interoperability for Microwave Access (WiMAX) with orthogonal frequency division multiple access (OFDMA) signaling, the set of available channels dynamically changes. Furthermore, conventional systems often assume that the available channels are "homogeneous" (i.e., different channels have similar range and support similar data rates). These assumptions do not hold true in situations such as, for example, where different channels are located on widely separated slices of frequency spectrum with different modulation schemes and different propagation characteristics. Moreover, conventional system fail to provide dedicated subchannels for private network users.

Therefore, there is a need for synchronous spectrum sharing systems based on orthogonal frequency-division multiplexing (OFDM) or OFDMA signaling. In particular, there is a need for synchronous spectrum sharing systems for dedicated networks using OFDM or OFDMA signaling.

SUMMARY OF THE INVENTION

The present disclosure provides a technique for synchronous spectrum sharing for dedicated networks based on orthogonal frequency-division multiplexing (OFDM) or orthogonal frequency division multiple access (OFDMA) signaling.

In one embodiment, the present disclosure provides a synchronous spectrum sharing system for use in a wireless communication system having a primary user node and a secondary user node. The system includes a frame detector configured to detect a frame of a broadcast waveform. The frame detector is also configured to extract idle spectrum information associated with a dedicated network subchannel of the frame to the secondary user node.

In another embodiment, the present disclosure provides a method of synchronous spectrum sharing for use in a wireless communication network having a primary user node and a secondary user node. The method includes detecting a frame of a broadcast waveform. The method also includes extracting idle spectrum information associated with a dedicated network subchannel of the frame to the secondary user node. The method further includes receiving data from the secondary user node in a first unused symbol slot identified in the idle spectrum information.

In still another embodiment, the present disclosure provides an apparatus for synchronous spectrum sharing for use in an OFDM/OFDMA wireless communication system. The apparatus includes a secondary user node configured to receive idle spectrum information for a dedicated network subchannel of an OFDMA frame. The secondary user node transmits data in a first unused symbol slot identified in the idle spectrum information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
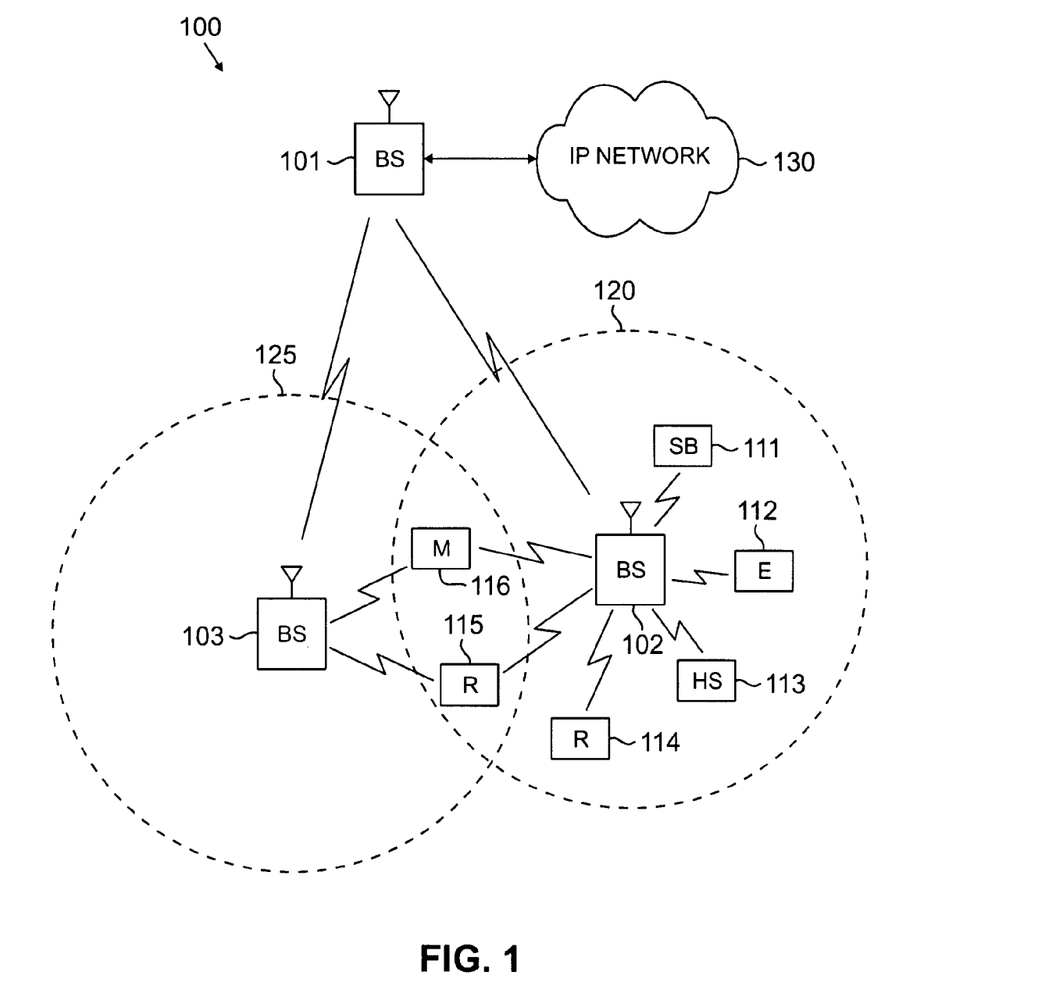
FIG. 1 is an exemplary wireless network suitable for synchronous spectrum sharing according to one embodiment of the present disclosure.

FIG. 1 illustrates an exemplary wireless network 100 suitable for synchronous spectrum sharing according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, cafe, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

Figure 2:
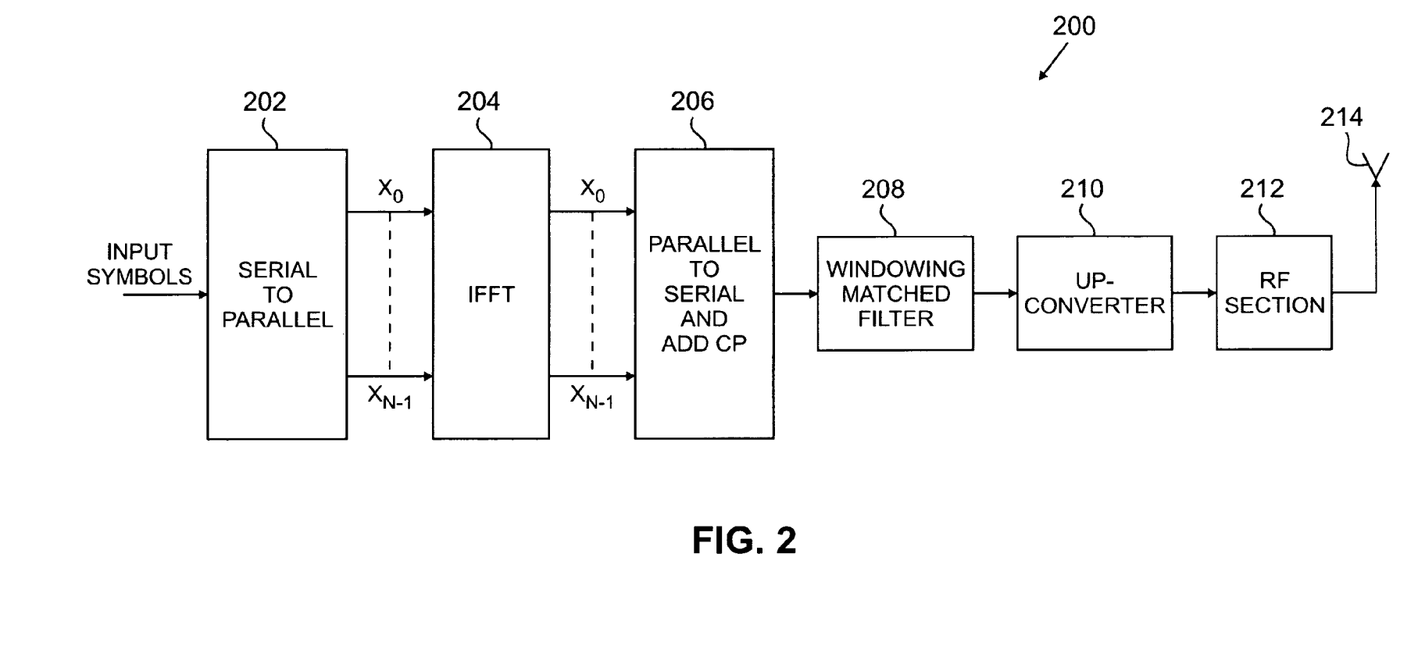
FIG. 2 is an exemplary block diagram of an orthogonal frequency-division multiplexing (OFDM) transmitter according to one embodiment of the present disclosure.

FIG. 2 is exemplary block diagram of a typical OFDM/OFDMA transmitter 200 according to one embodiment of the present disclosure. Transmitter 200 constructs, for example, an OFDM/OFDMA composite signal by first passing the serial output of a formatted, encoded, interleaved data signal through serial-to-parallel converter 202. Serial-to-parallel converter 202 separates each data signal into parallel data streams (e.g., $X_0 \ldots X_{N-1}$). A mapping function (MAP) within serial-to-parallel converter 202 maps each parallel data stream into I and Q modulation symbols, which are then applied to inverse fast Fourier transform (IFFT) block 204. The subcarrier separation is preferably an inverse of the symbol rate. IFFT block 204 computes the IFFT of each data stream and passes the output to parallel-to-serial and cyclic prefix (CP) block 206.

Parallel-to-serial and CP block 206 combines each parallel data stream into a data signal and introduces CP to aid in eliminating inter-symbol interference (ISI) and inter-block interference as later described in detail herein. Parallel-to-serial and CP block 206 sums the multiple subcarriers to the transmission frequency. For operation in time division duplex (TDD) mode, Parallel-to-serial and CP block 206 inserts a guard interval (GI) into the signal. The output of parallel-to-serial and CP block 206 is passed to windowing matched filter 208 and then to up-converter block 210. The output of up-converter block 210 is then passed to RF section block 212 and transmitted via antenna 214. Accordingly, in the example shown in FIG. 2, user data signals may be represented by a set of 2N subcarriers. In addition, pilot plus control signaling may be represented by a set of 2M separate subcarriers.

Figure 3:
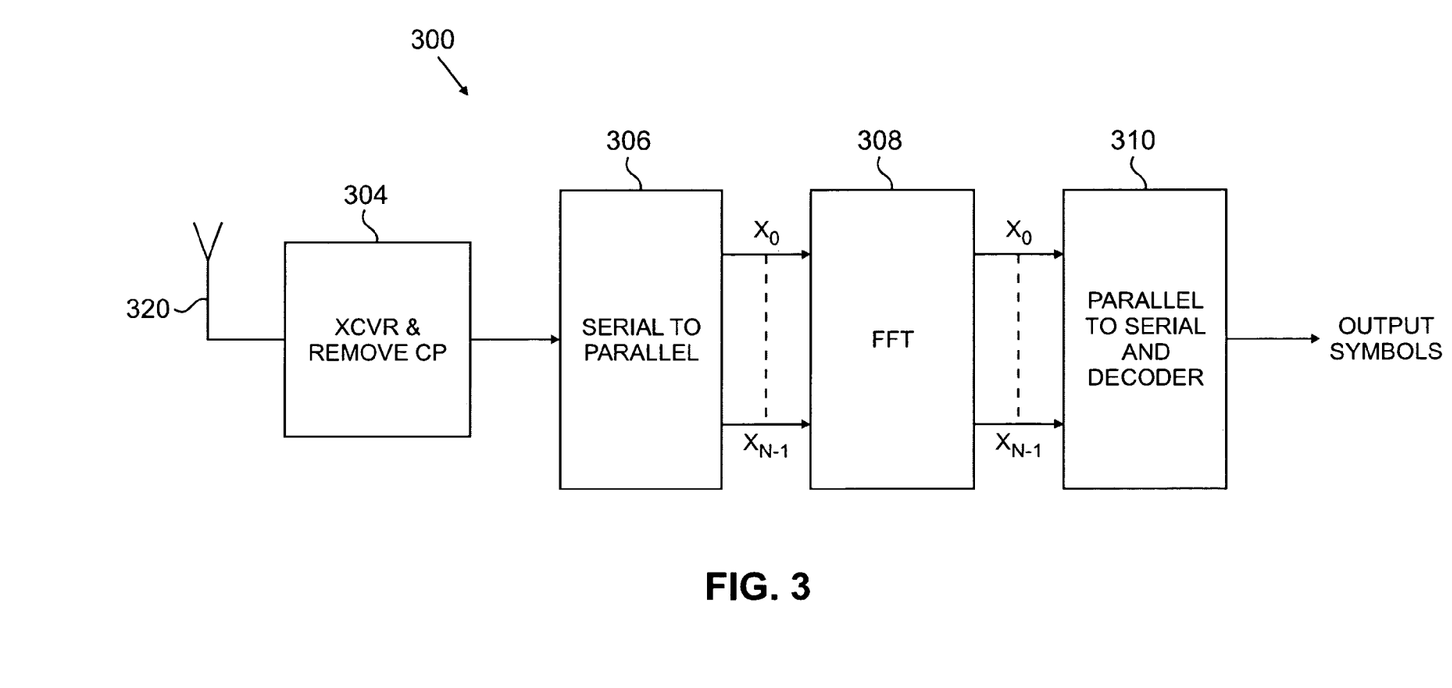
FIG. 3 is an exemplary block diagram of an OFDM receiver according to one embodiment of the present disclosure

FIG. 3 is an exemplary block diagram of a typical OFDM/OFDMA receiver 300 according to one embodiment of the present disclosure. Receiver 300 detects the transmitted symbols and essentially reverses the process implemented by transmitter 200 described above. For example, the signal transmitted by antenna 214 is received by antenna 302. The signal is passed to transceiver and CP remove block 304. Transceiver and CP remove block 304 removes the CP from the signal and passes the signal to serial-to-parallel block 306. Serial-to-parallel block 306 separates the data signal into parallel data streams (e.g., $X_0 \ldots X_{N-1}$). A MAP within serial-to-parallel converter 201 maps each parallel data stream into I and Q modulation symbols, which are then passed to fast Fourier transform (FFT) block 308. The output of FFT block 308 is then passed to parallel-to-serial and decoder block 310 and then output as desired.

Figure 4:
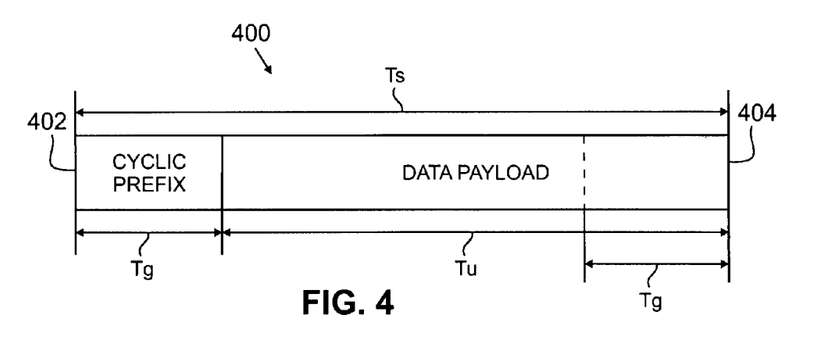
FIG. 4 depicts the insertion of a cyclic prefix (CP) to a data payload according to one embodiment of the present disclosure.

FIG. 4 illustrates OFDM symbol 400 in which CP 402 is inserted into data payload 404 according to one embodiment of the present disclosure where the total symbol period ($T_s$) is greater than the sum of the guard times ($T_g$) and the useful symbol period ($T_u$). OFDM waveforms provide increased symbol duration (i.e., $T_s$ and $T_u$) and thus improves the robustness of OFDM to delay spread. Accordingly, with the introduction of CP 402, ISI could be eliminated as long as the duration of CP 402 is longer than the channel delay spread. CP 402 is typically a repetition of the last samples of data portion of the block that is appended to the beginning of data payload 404 as shown in FIG. 4. CP 402 prevents inter-block interference and makes the channel appear circular. CP 402 therefore permits low-complexity frequency domain equalization. While CP 402 somewhat reduces bandwidth efficiency, the impact of CP 402 is similar to the "roll-off factor" in raised-cosine filtered single-carrier systems. Notably, OFDM has a very sharp, almost "brick-wall" spectrum. Thus, a large fraction of the allocated channel bandwidth may be utilized for data transmission and for moderating the loss in efficiency due to CP 402.

Similar attributes exist for OFDMA. The OFDMA symbol structure consists of three types of subcarriers: (1) Data subcarriers for data transmission; (2) Pilot subcarriers for estimation and synchronization purposes; and (3) Null subcarriers for no transmission (typically used for guard bands and DC carriers). Active subcarriers (i.e., data and pilot subcarriers) are grouped into subsets of subcarriers called subchannels.

In certain standards such as, for example, IEEE-802.16-2004 and IEEE-802.16-2005, the minimum frequency-time resource unit of subchannelization is one slot. One slot is typically equal to 48 data tones or subcarriers. The two types of sub-carrier permutations for subchannelization are the diversity permutation and the contiguous permutation.

The diversity permutation draws subcarriers pseudo-randomly to form a subchannel. Diversity permutation generally provides frequency diversity and inter-cell interference averaging as later shown in FIGS. 5A and 5B where there are 512 subcarriers. The diversity permutations include DL FUSC, DL PUSC, UL PUSC and other optional permutations. With DL PUSC, for each pair of OFDM symbols, the available or usable subcarriers are grouped into clusters containing 14 contiguous subcarriers per symbol, with pilot and data allocations in each cluster in the even and odd symbols.

A re-arranging scheme is used to form groups of clusters such that each group is made up of clusters that are distributed throughout the sub-carrier space. A subchannel in a group contains two (2) clusters and is comprised of 48 data subcarriers and eight (8) pilot subcarriers. Analogous to the cluster structure for DL, a tile structure is defined for the UL PUSC. The available sub-carrier space is split into tiles and six (6) tiles, chosen from across the entire spectrum by means of a re-arranging/permutation scheme, are grouped together to form a slot. The slot is comprised of 48 data subcarriers and 24 pilot subcarriers in three (3) OFDM symbols.

The contiguous permutation, on the other hand, groups a block of contiguous subcarriers to form a subchannel. The contiguous permutations include DL advanced modulation and coding (AMC) and UL AMC, and have the same structure. A bin consists of nine (9) contiguous subcarriers in a symbol, with eight (8) assigned for data and one assigned for a pilot. A slot in AMC is defined as a collection of bins of the type (N×M=6), where N is the number of contiguous bins and M is the number of contiguous symbols. Thus the allowed combinations are [(6 bins, 1 symbol), (3 bins, 2 symbols), (2 bins, 3 symbols), (1 bin, 6 symbols)]. AMC permutation enables multi-user diversity by choosing the subchannel with the best frequency response.

The IEEE-802.16-2005 Wireless MAN OFDMA mode is based on the concept of scalable OFDMA (S-OFDMA). S-OFDMA supports a wide range of bandwidths to flexibly address the need for various spectrum allocation and usage model requirements. The scalability of the OFDMA system is accomplished by adjusting the FFT size while fixing the sub-carrier frequency spacing at 10.94 kHz. Since the resource unit sub-carrier bandwidth and symbol duration is fixed, the impact to higher layers is minimal when scaling the bandwidth. A set of embodiments for S-OFDMA parameters are listed in TABLE 1 below.

TABLE 1

SCALABLE OFDMA PARAMETERS OF WIMAX

| Parameters | Values | | | |
|---|---|---|---|---|
| System Channel Bandwidth (MHz) | 1.25 | 5 | 10 | 20 |
| Sampling Frequency ($F_p$ in MHz) | 1.4 | 5.6 | 11.2 | 22.4 |
| FFT Size ($N_{FFT}$) | 128 | 512 | 1024 | 2048 |
| Number of Subchannels | 2 | 8 | 16 | 32 |
| Sub-Carrier Frequency Spacing | 10.94 kHz | | | |
| Useful Symbol Time ($T_b = 1/f$) | 91.4 microseconds | | | |
| Guard Time ($T_g = T_b/8$) | 11.4 microseconds | | | |
| OFDMA Symbol Duration ($T_S = T_b + T_g$) | 102.9 microseconds | | | |
| Number of OFDMA Symbols (5 ms Frame) | 48 | | | |

Figure 5A:
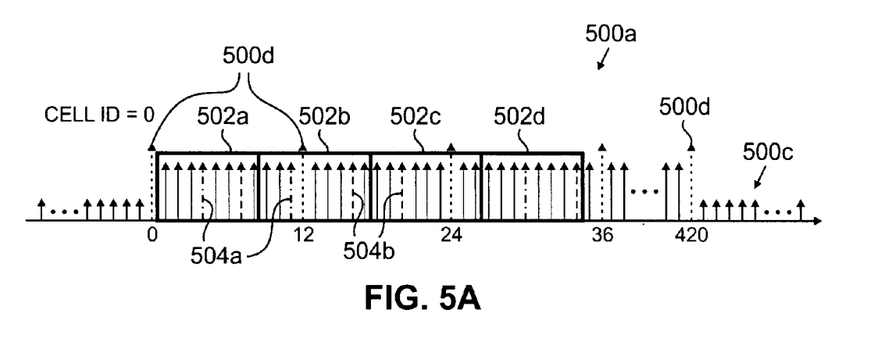
FIGS. 5A and 5B depict exemplary distributed sub-carrier allocations according to one embodiment of the present disclosure.
Figure 5B:
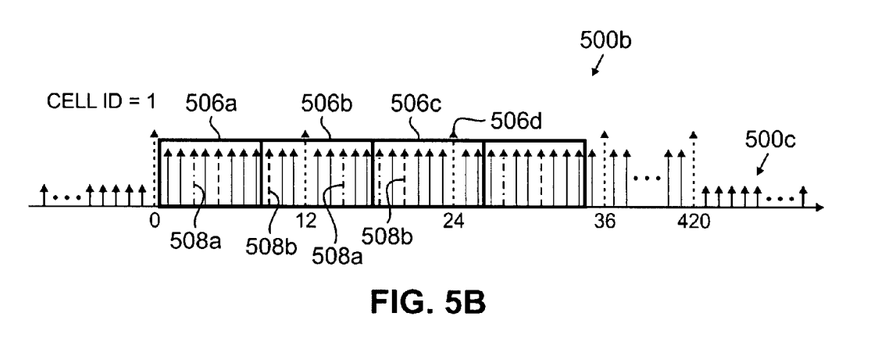

FIGS. 5A and 5B depict exemplary distributed sub-carrier allocations 500a and 500b (sometimes collectively referred to herein as distributed sub-carrier allocation 500) associated with a particular Fourier fast transform (FFT) bin number according to one embodiment of the present disclosure. FIGS. 5A and 5B depict distributed sub-carrier allocations 500a and 500b in, for example, Cell ID 0 and Cell ID 1, respectively, and are referred to herein for illustration purposes only.

FIG. 5A illustrates four groups of subcarriers, groups 502a, 502b, 502c and 502d (collectively referred to herein as groups 502). Each of the subcarriers depicted in groups 502 are associated with a specific subchannel, subchannels 504a and 504b (collectively referred to herein as subchannels 504). Although only two subchannels 504 are shown in FIG. 5B, it should be understood that any suitable number of subchannels 504 may be apparent. Each of subchannels 504 generally includes forty-eight (48) data subcarriers.

Similarly, FIG. 5B illustrates four groups of subcarriers, groups 506a, 506b, 506c and 506d (collectively referred to herein as groups 506). Each of the subcarriers depicted in groups 506 are associated with a specific subchannel, subchannels 508a and 508b (collectively referred to herein as subchannels 508). Although only two subchannels 508 are shown in FIG. 5B, it should be understood that any suitable number of subchannels 508 may be apparent. Each of subchannels 508 generally includes forty-eight (48) data subcarriers.

Figure 6:
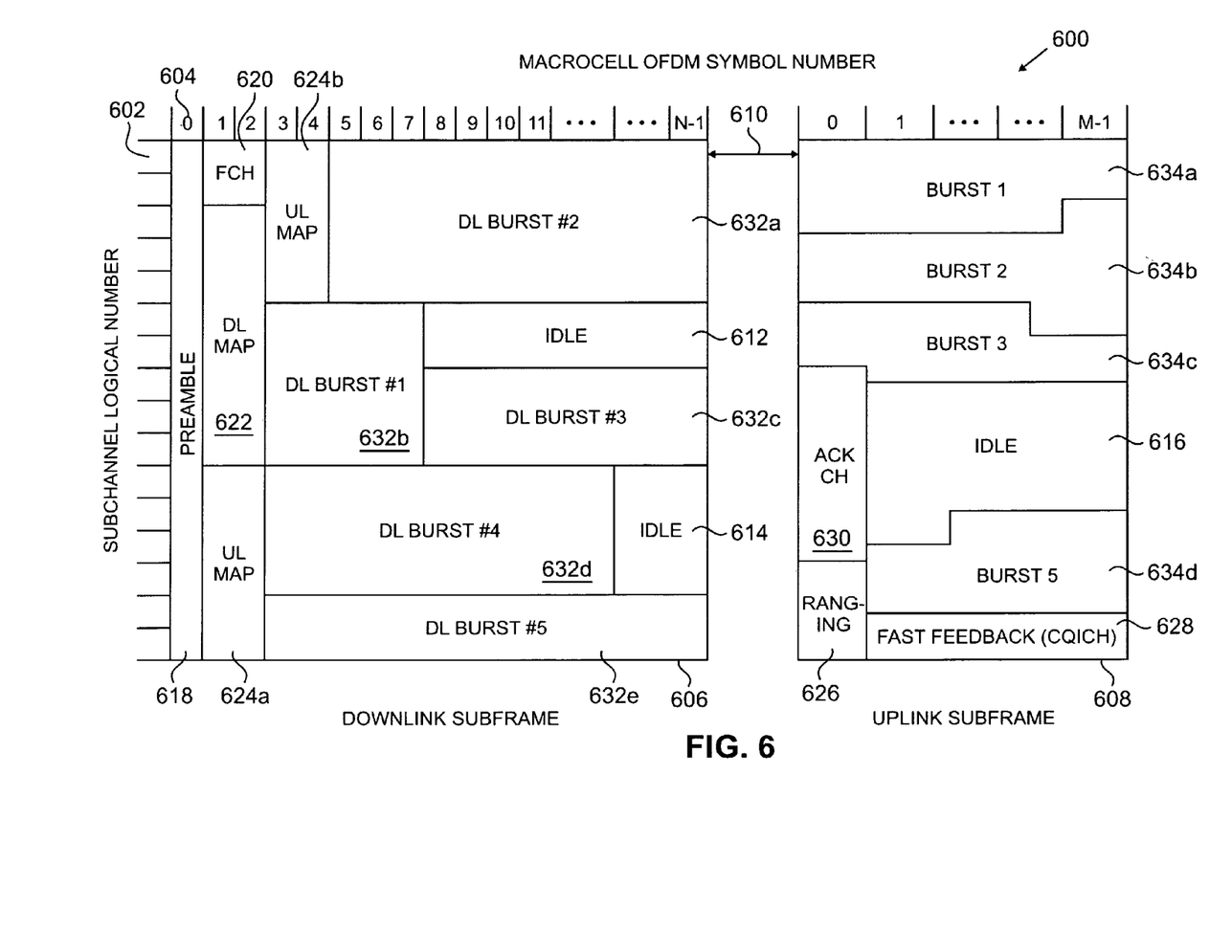
FIG. 6 is an OFDMA frame structure for a time division duplex (TDD) implementation according to one embodiment of the present disclosure.

FIG. 6 illustrates a WiMAX OFDM/OFDMA broadcast frame 600 for TDD implementation according to one embodiment of the present disclosure. Broadcast frame 600 illustrates the relationship between a given subchannel logical number 602 and a macrocell OFDM/OFDMA time slot or symbol number 604. Broadcast frame 600 is further divided into and supports subchannelization in DL subframe 606 and UL subframe 608. DL sub-frame 606 and UL subframe 608 are separated by transmit/receive transition gaps (TTG) and receive/transmit transition gaps (RTG) (collectively referred to herein as transition gap 610). Transition gap 610 prevents DL and UL transmission collisions. DL subframe 606 and UL subframe 608 include several unused or idle spectrum such as, for example, idle blocks 612, 614 and 616. Although a specified number of idle blocks is illustrated in DL subframe 606 and UL subframe 608, it should be understood that any number of idle blocks could in fact be available in accordance with the present disclosure.

Control information for broadcast frame 600 is used to ensure optimal system operation. For example, control information may include preamble 618, frame control head (FCH) 620, DL-MAP 622, UL-MAPs 624a and 624b (collectively referred to herein as UL-MAP 624), UL ranging subchannel 626, UL channel quality indicator channel (CQICH) 628 and UL acknowledge subchannel (ACK) 630. Preamble 618 is used for synchronization of the first symbol number 604 of broadcast frame 600. FCH 620 follows preamble 618 and provides frame configuration information such as MAP message lengths, coding schemes and usable subchannels.

DL-MAP 622 and UL-MAP 624 provide subchannel allocation and other control information for DL subframe 606 and UL subframe 608, respectively. UL ranging subchannel 626 is allocated for mobile stations (MS) to perform closed-loop time, frequency, and power adjustment as well as bandwidth requests. UL CQICH 628 is allocated for the MS to feedback channel state information, while UL ACK 630 is allocated for the MS to feedback DL (hybrid automatic request) HARQ acknowledgement.

Finally, DL subframe 606 is shown with several DL data bursts 632a, 632b, 632c, 632d and 632e (sometimes collectively referred to herein as DL data bursts 632). It should be understood that any suitable number of DL data bursts 632 may be included in DL subframe 606. Similarly, UL subframe 608 is shown with several UL data bursts 634a, 634b, 634c, 634d and 634e (sometimes collectively referred to herein as UL data bursts 634). It should be understood that any suitable number of UL data bursts 634 may be included in UL subframe 606.

Figure 7A:
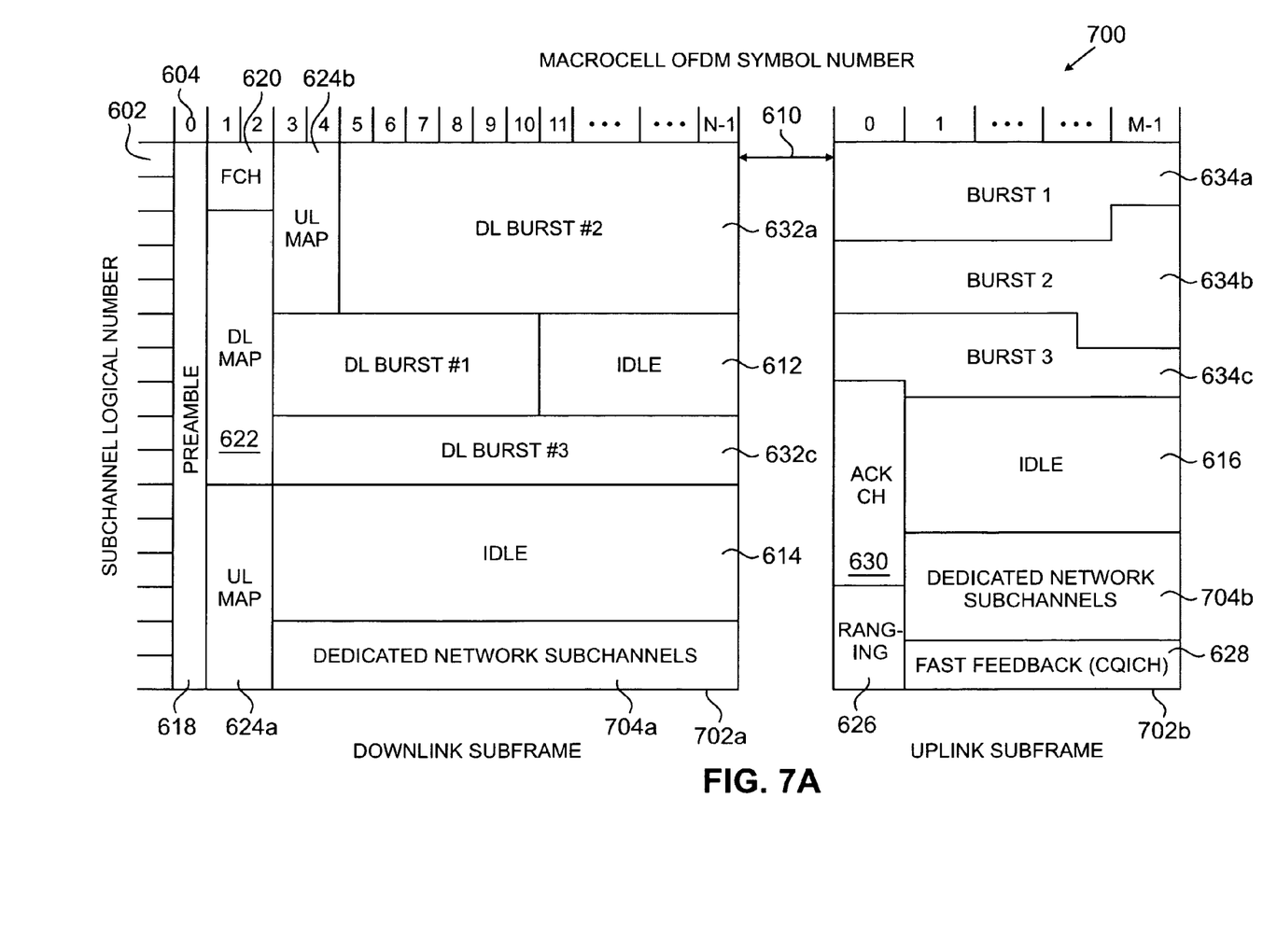
FIG. 7A is an OFDMA frame structure having a dedicated network channel according to one embodiment of the present disclosure.

FIG. 7A depicts broadcast frame 700. According to one embodiment of the present disclosure, broadcast frame 700 includes DL subframe 702a and UL subframe 702b. Broadcast frame 700 includes elements that are similar to broadcast frame 600. Broadcast frame 700, however, also includes dedicated network subchannel 704a in the DL subframe 702a and dedicated network subchannel 704b in the UL subframe 702b. Dedicated network subchannel 704a and dedicated subchannel 704b are sometimes collectively referred to herein as dedicated subchannels 704.

In one embodiment, dedicated network subchannel 704 could occupy the entire subchannel or several subchannels. In other embodiments, dedicated network subchannels 704 could occupy any part of a subchannel or multiple parts of several channels. Preferably, embodiments of dedicated network subchannel 704 are reserved for use by, for example, private networks, enterprise networks, premium service networks, a particular femtocell device or group of femtocell devices, a particular WiMAX cell or group of WiMAX cells, a small office/home office (SOHO) or group of SOHOs, a femtocell or group of femtocells, or any other network, sub-network or other groups of devices requiring dedicated service to a particular set of users or groups of users.

The allocation of a separate dedicated network subchannel 704 minimizes any interference with the cellular service because the OFDMA subcarriers are orthogonal. Accordingly, embodiments of the present disclosure have many advantages over conventional CDMA or WCDMA systems.

Figure 7B:
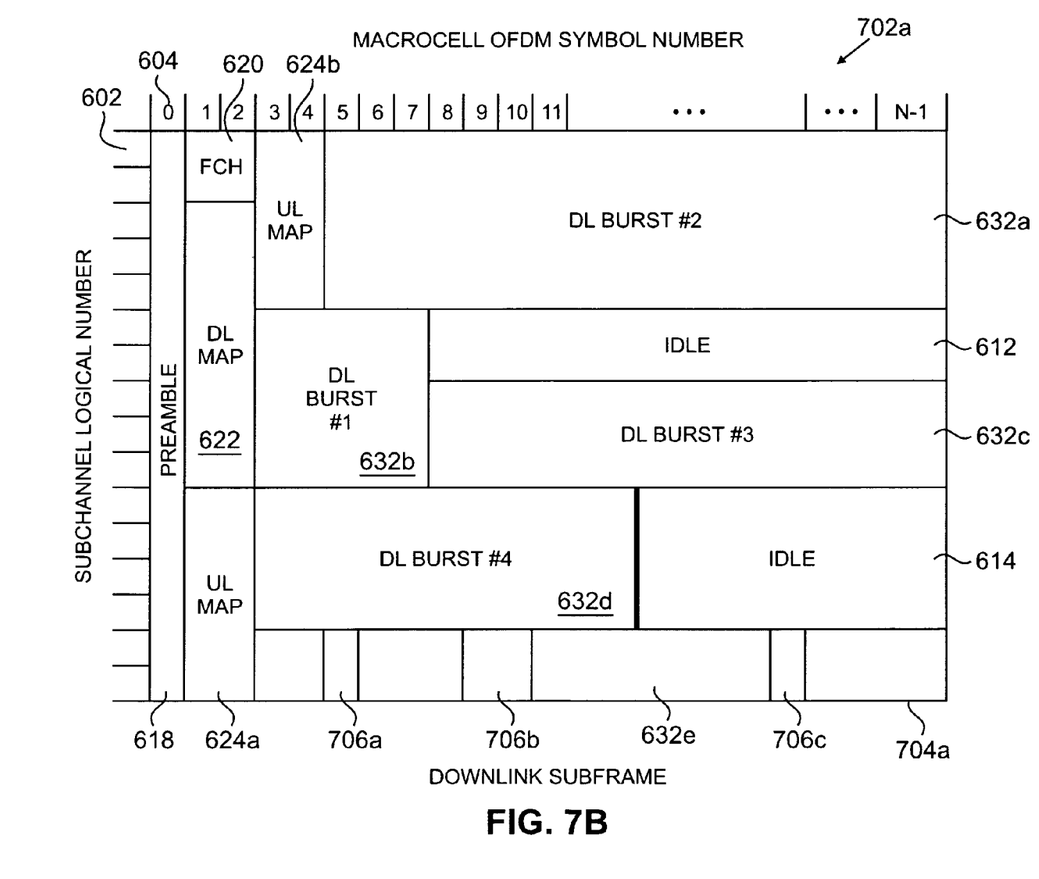
FIG. 7B is an OFDMA frame structure with secondary node packet bursts in unused OFDM symbol slots in the dedicated network channel according to one embodiment of the present disclosure.

FIG. 7B is another illustration of exemplary DL subframe 702a having idle spectrum blocks 706a, 706b and 706c (sometimes collectively referred to herein as idle spectrum blocks or secondary node bursts 706). According to one embodiment, each one of secondary user nodes 708a-708k (sometimes collectively referred to as secondary user nodes 708) shown in FIG. 7C could ascertain which set of subcarriers and symbol numbers 604 will be idle or unassigned during a given OFDM/OFDMA frame. For example, secondary nodes 708 could locate idle spectrum blocks 706 in dedicated network subchannel 704a during a given OFDM/OFDMA frame such as in broadcast frame 700. In other embodiments, secondary nodes 708 could locate idle spectrum in subchannels (other than dedicated network subchannel 704) found in broadcast frame 700 such as, for example, in idle block 612 or idle block 614.

Figure 7C:
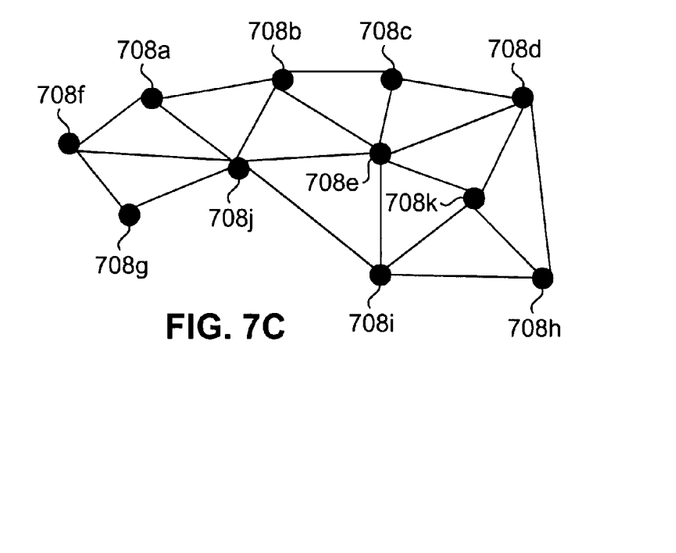
FIG. 7C illustrates an exemplary cluster of secondary nodes found in a wireless network according to one embodiment of the present disclosure.

In one embodiment, if one of secondary nodes 708 does not have data to transmit, that secondary node 708 listens for data symbols transmitted by neighboring secondary nodes 708 on idle subcarriers during the idle symbol periods (e.g., idle spectrum blocks 706). On the other hand, if one of secondary nodes 708 has data to transmit, that secondary node 708 transmits data transmitted to neighboring secondary nodes 708 on idle subcarriers during the idle symbol periods for the down-link (e.g., idle spectrum blocks 706). Transmission by the ad hoc or secondary nodes 708 within up-link idle spectrum is similarly accomplished.

Accordingly, in one embodiment, the present disclosure provides a system for providing ad hoc network users to share spectrum in networks that use OFDMA on a non-interfering or leasing basis. Dedicated subchannel 704 is preferably reserved for dedicated or private networks and should not be assignable to users that are not part of the ad hoc or dedicated network. The RF transmitter power of devices in the dedicated network should aid in limiting the size of the dedicated network coverage area. In some embodiments, the base transceiver station could notify users of the dedicated network of the subcarriers reserved for the dedicated network in that particular cell. For example, the MAC processing block of a particular BTS could forward information about dedicated subchannel 704 to a node controller associated with a particular one of secondary nodes 708. To establish access to the OFDMA channel, that secondary node 708 detects the broadcast OFDMA waveform and synchronizes to the OFDMA frame to extract idle spectrum information using a frame detector.

Figure 8:
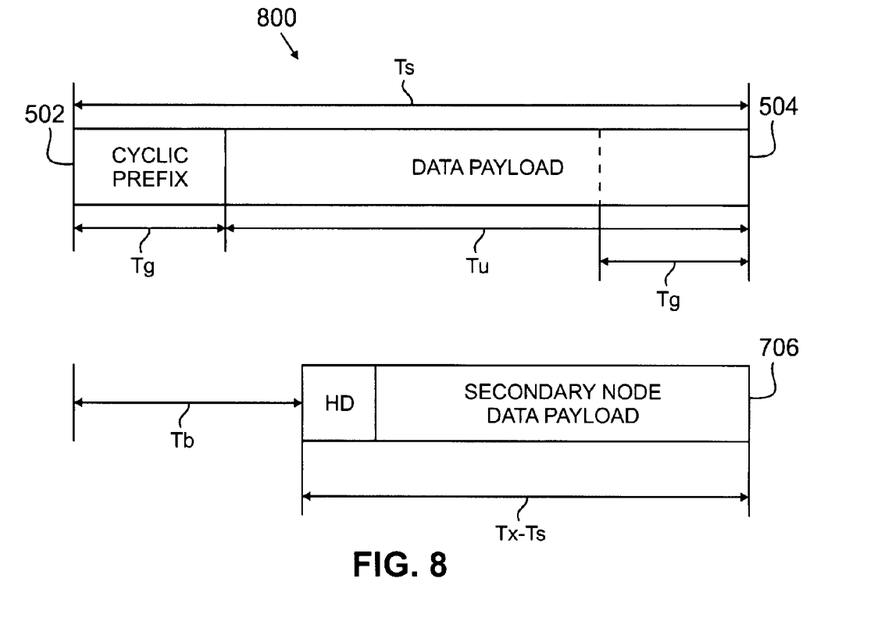
FIG. 8 is an exemplary secondary node data burst relative to an OFDMA frame structure for a given OFDM symbol period.

Referring now to FIG. 8, the symbol period or length ($T_x$) of secondary node data bursts 706 is preferably kept less than or equal to in time duration as the OFDM symbol period ($T_s$) in broadcast frame 700. Secondary node data burst 706 may use a variable length symbol format. However, a shorter symbol period ($T_x$) implies a greater subcarrier spacing if the secondary node modulation is based on OFDM as well.

In one embodiment of the present disclosure, the secondary node 708 starts transmission after the passage of a guard time ($T_g$) such as in the ALOHA scheme shown in FIG. 8. In another embodiment of the present disclosure, the transmitting node determines if another secondary node 708 is already transmitting in unassigned subcarriers in symbol number 604 by conventional carrier sense multiple access (CSMA) techniques. As an example, secondary node 708c could transmit data in idle spectrum blocks 706a, while at the same time secondary node 708b could transmit data in idle spectrum blocks 706b. Moreover, two secondary nodes 708 may transmit simultaneously in the same symbol number 604 in different subcarriers. If unassigned subcarriers are found to be in use by other secondary nodes 708, other secondary nodes 708 waits for the next idle block (e.g., idle spectrum blocks 706a, 706b and 706c or, in some embodiments, idle block 612, 614 or 616) and repeats the access process.

In one embodiment, the battery life for battery-powered secondary nodes 708 could be extended. For example, secondary nodes 708 can power-down the transmitter circuitry of there is no data to transmit. Furthermore, secondary nodes 708 can power-down the receiver circuitry and other non-essential circuits during symbol number 604 when there are no idle subcarriers. The secondary node powers up at the appropriate time to receive the OFDM frame, DL-MAP and UL-MAP.

Figure 9:
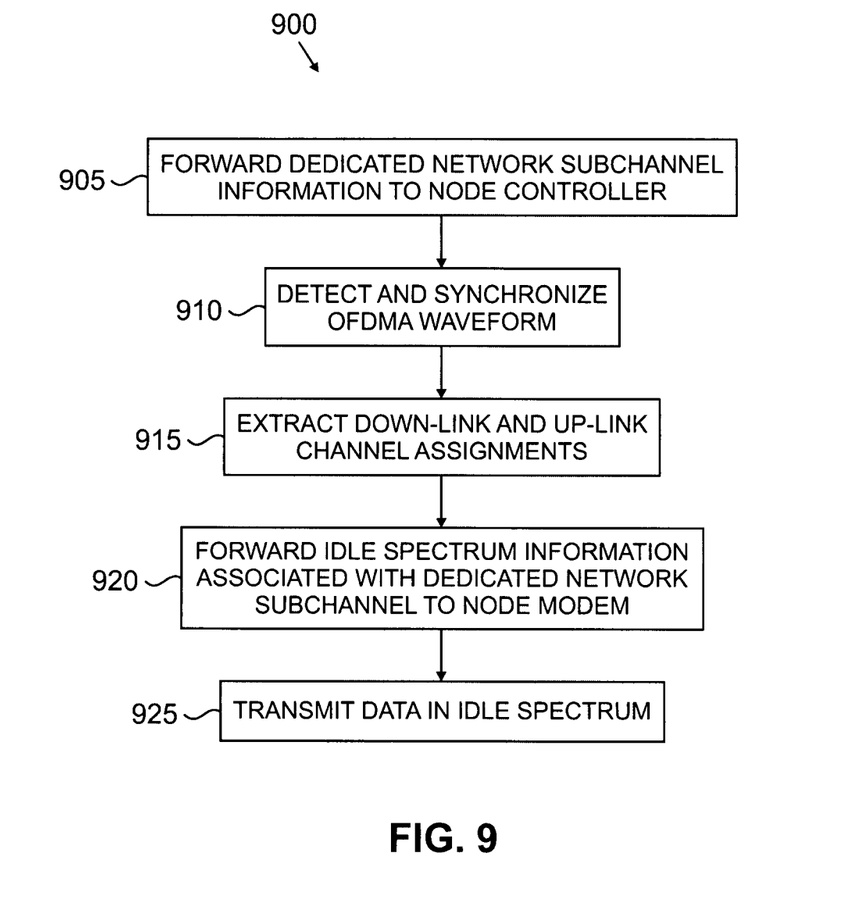
FIG. 9 is a somewhat simplified a flow diagram illustrating a method of synchronous spectrum sharing according to one embodiment of the present disclosure.

FIG. 9 is a somewhat simplified flow diagram of method 900 for synchronous spectrum sharing based on OFDM/OFDMA signaling for a dedicated network subchannel such as, for example, dedicated network subchannel 704a, according to one embodiment of the present disclosure. In step 905, a base station such as BS 101 forwards information about dedicated subchannel 704, to a node controller associated with, for example, secondary node 708. To establish access to the OFDMA channel, secondary node 708 detects the broadcast OFDMA waveform and synchronizes to the OFDMA frame, such as broadcast frame 700, in step 910.

In step 915, secondary node 708 extracts the down-link and up-link channel assignments for that frame and idle spectrum information is identified. The idle spectrum information associated with dedicated network channel 704 is then forwarded to the node modem in step 920. Secondary node 708 thus gains dynamic access to dedicated network channel 704 using idle spectrum blocks 706 (i.e., "white space") and can transmit data in the idle spectrum blocks 706 in a non-interfering or leasing basis in step 925. Accordingly, secondary users could dynamically form ad-hoc mesh network communications in fixed or mobile scenarios without interfering with agreements/etiquettes imposed by other users such as primary users and/or regulatory entities.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A synchronous spectrum sharing system for use in a wireless communication system having a primary user node and a secondary user node, the system comprising:
   a frame detector configured to:
      detect a frame of a broadcast waveform, the broadcast waveform being an OFDM waveform or an OFDMA waveform,
      extract down-link and up-link channel assignments for blocks within a dedicated network subchannel from the frame, and
      identify idle spectrum blocks within the dedicated network subchannel of the frame using the extracted down-link and up-link channel assignments.

2. The system set forth in claim 1, further comprising the secondary user node configured to transmit data in non-contiguous idle spectrum blocks identified within the dedicated network subchannel.

3. The system set forth in claim 1, wherein the idle spectrum blocks identified within the dedicated network subchannel of the frame comprises non-contiguous idle spectrum blocks identified within the dedicated network subchannel.

4. The system set forth in claim 1, wherein the dedicated network subchannel comprises an entire subchannel of the frame.

5. The system set forth in claim 1, wherein the dedicated network subchannel comprises a portion of a subchannel of the frame.

6. The system set forth in claim 1, wherein the dedicated network subchannel comprises two or more subchannels of the frame.

7. The system set forth in claim 1, wherein the frame detector is one of: an OFDM frame detector and an OFDMA frame detector.

8. The system set forth in claim 1, wherein a second unused symbol slot identified in the idle spectrum blocks is suitable for data transmission by the secondary user node.

9. The system set forth in claim 1, wherein the secondary user node is one of a plurality of secondary user nodes in the system and comprises the frame detector, wherein the secondary node is configured to:
receive information about the dedicated network subchannel reserved for a private network for the plurality of secondary user nodes, and
wherein the frame detector is further configured to:
identify idle spectrum blocks within the dedicated network subchannel of the frame and within other subchannels of the frame not within the dedicated network subchannel.

10. For use in a wireless communication network having a primary user node and a secondary user node, a method of synchronous spectrum sharing, the method comprising:
detecting a frame of a broadcast waveform, the broadcast waveform being an OFDM waveform or an OFDMA waveform;
extracting down-link and up-link channel assignments for blocks within a dedicated network subchannel from the frame;
identifying idle spectrum blocks within the dedicated network subchannel of the frame using the extracted down-link and up-link channel assignments; and
sending data, by the secondary user node, in a first unused symbol slot identified in the idle spectrum blocks.

11. The method set forth in claim 10, wherein:
the idle spectrum blocks identified within the dedicated network subchannel of the frame comprises non-contiguous idle spectrum blocks identified within the dedicated network subchannel, and
sending data by the secondary user node comprises sending data in at least two of the non-contiguous idle spectrum blocks identified within the dedicated network subchannel of the frame.

12. The method set forth in claim 10, wherein the dedicated network subchannel comprises an entire subchannel of the frame.

13. The method set forth in claim 10, wherein the dedicated network subchannel comprises a portion of a subchannel of the frame.

14. The method set forth in claim 10, wherein the dedicated network subchannel comprises two or more subchannels of the frame.

15. The method set forth in claim 10, wherein the detecting the frame is accomplished by one of: an OFDM frame detector and an OFDMA frame detector.

16. The method set forth in claim 10 further comprising:
receiving data from a second secondary user node into a second unused symbol slot identified in the idle spectrum blocks.

17. The method set forth in claim 10, wherein the secondary user node is one of a plurality of secondary user nodes in the network, the method further comprising:
receiving, by the secondary user node, information about the dedicated network subchannel reserved for a private network for the plurality of secondary user nodes; and
identifying idle spectrum blocks within the dedicated network subchannel of the frame and within other subchannels of the frame not within the dedicated network subchannel.

18. For use in an OFDM/OFDMA wireless communication system, an apparatus for synchronous spectrum sharing, the apparatus comprising:
a secondary user node configured to:
extract a down-link channel assignment and an up-link channel assignment for blocks within a dedicated network subchannel of an OFDMA frame,
identify idle spectrum blocks within the dedicated network subchannel using the extracted down-link and up-link channel assignments, and
transmit data in a first unused symbol slot identified in the idle spectrum blocks.

19. The apparatus set forth in claim 18, wherein:
the idle spectrum blocks identified within the dedicated network subchannel of the frame comprise non-contiguous idle spectrum blocks identified within the dedicated network subchannel, and
the secondary user node is configured to transmit data in at least two of the non-contiguous idle spectrum blocks identified within the dedicated network subchannel of the frame.

20. The apparatus set forth in claim 18, wherein the dedicated network subchannel comprises at least one of: an entire subchannel of the frame, a portion of a subchannel of the frame, and two or more subchannels of the frame.

21. The apparatus set forth in claim 18, wherein a second secondary user node transmits data in a second unused symbol slot identified in the idle spectrum blocks.

22. The apparatus set forth in claim 18, wherein the secondary user node is one of a plurality of secondary user nodes in the system and wherein the secondary node is further configured to:
receive information about the dedicated network subchannel reserved for a private network for the plurality of secondary user nodes, and
identify idle spectrum blocks within the dedicated network subchannel of the OFDMA frame and within other subchannels of the OFDMA frame not within the dedicated network subchannel.

* * * * *